Oct. 23, 1951 — R. S. WADE — 2,572,222
DOORFRAME
Filed March 28, 1947
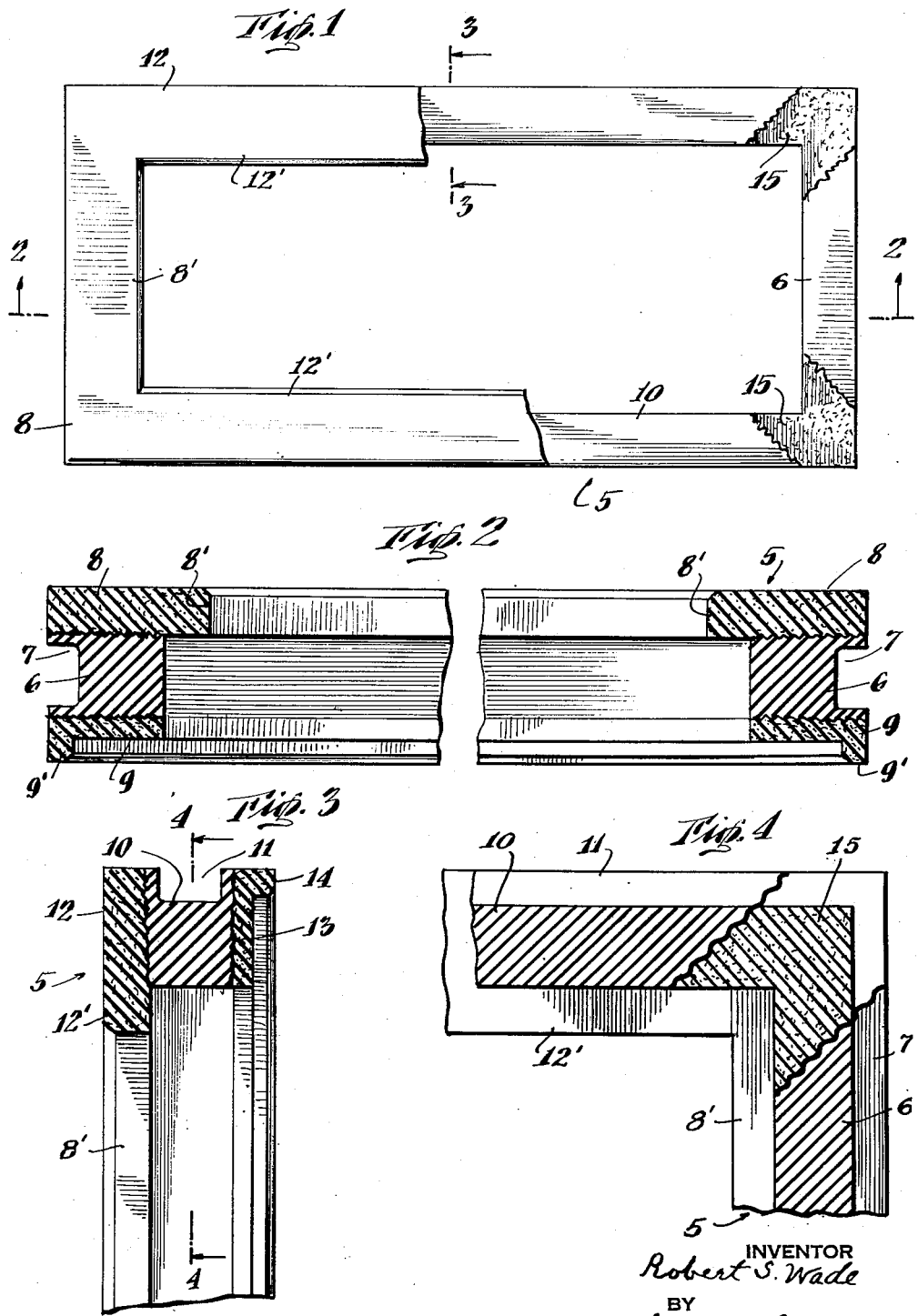

Patented Oct. 23, 1951

2,572,222

UNITED STATES PATENT OFFICE 2,572,222

DOORFRAME

Robert S. Wade, Akron, Ohio, assignor to American Hard Rubber Company, New York, N. Y., a corporation of New York Application March 28, 1947, Serial No. 737,851

1 Claim. (Cl. 20—35)

This invention relates to a door frame that is particularly useful as a refrigerator door frame. It is adapted to slide vertically or horizontally to open and close entrance to a refrigerator or the like. For this purpose the frame is provided with grooves along its edges and ends adapted to mate with strips or projections along the openings, thus making airtight joints.

In carrying out the invention, rubber is installed, preferably in the form of strips, each comprising a strip of hard rubber between strips of soft rubber. The faces of the hard rubber strips are provided with grooves to form airtight joints with ribs or the like along the margins of the openings along which the frame slides.

The invention may be understood from the description in connection with the accompanying drawing, in which:

Fig. 1 is a side view of the door frame shown partly broken away;

Fig. 2 is a section along the line 2—2 of Fig. 1;

Fig. 3 is a section along the line 3—3 of Fig. 1; and

Fig. 4 is a section along the line 4—4 of Fig. 3, showing one of the corners of the door frame.

In the drawing, reference character 5 indicates a display type refrigerator door frame which may be a molded frame, for example. Strips 6 of hard rubber are placed along the end edges of the door frame 5, as shown in section in Fig. 2. These strips 6 are each provided with a groove 7. A layer or strip of soft rubber 8 is installed along the outer side of the hard rubber 6 and extends a short distance inwardly of the inner edge of the frame 5 as shown at 8'. Another strip 9 of soft rubber having a flange 9' along its edge is installed along the other side of the hard rubber strip 6.

A longer strip of hard rubber 10 is placed in the same way along each of the top and bottom sides of the frame 5, as shown in Figs. 1, 3 and 4. Each of these hard rubber strips is also provided with a groove 11 like groove 7. A strip 12 of soft rubber is installed along one side of each of the hard rubber strips 10 and extends a short distance over the aperture defined by the side of frame 5, as shown at 12'. Another strip 13 of soft rubber is installed along the other side of each strip 10 of hard rubber. It is provided with a flange 14.

The hard rubber strips 6 and 10 stiffen the side and end members of the frame 5 and also provides a smooth surface to enable the door to slide easily.

As shown in Figs. 1 and 4, the hard rubber strips 10 and 6 are separated at each corner by an insert of soft rubber 15, so that these molded members of hard rubber that should be at right angles become aligned with the glass assembly of the door when it is installed, so that the strains in the glass and the frame that usually occur in a rigid frame are greatly decreased or entirely eliminated. With this invention the frame can be easily made straight and the corners square without the necessity of complicated or special mechanical devices. The rubber strips 6 and 10 are aligned with the glass when the door is assembled. In this way the strains that are set up when a rigid frame is made, are decreased or entirely eliminated. The frame can be squared and straightened without difficulty when the parts are being assembled.

Some of the advantages of this invention are: hard rubber installed between two layers of soft rubber provides a smooth surface which can slide along the door sill very easily and smoothly; the hard rubber reinforcing members impart rigidity, helping to keep the parts around the edges of the glass in position; the soft rubber materials render the use of metal inserts unnecessary and provide anchor means for screws, nails or other fastening means, when needed; the use of soft rubber decreases the danger of the glass becoming broken and obviates the need of soft rubber bumpers or door jambs; and a simpler type of mold for door frames can be used, thus decreasing the cost.

What is claimed is:

A sliding door construction for a refrigerator cabinet, comprising top, bottom and end members together making up a substantially rectangular frame for holding at least one transparent panel, each of said members having a core portion of hard rubber faced with soft rubber on the inside and outside of the door construction, and soft rubber inserts at each corner of said door construction between the ends of the hard rubber cores of said members; said members and said inserts being united to form a substantially integral door construction for receiving said transparent panel, and the hard rubber cores of said top and bottom members being provided with grooves acting as guiding means for cooperation with a door frame to facilitate the sliding of the door construction.

ROBERT S. WADE.

REFERENCES CITED

The following references are of record in the file of this patent:

UNITED STATES PATENTS

| Number | Name | Date |
|---|---|---|
| 1,950,037 | Schaefer | Mar. 6, 1934 |
| 1,963,941 | Duffy | June 19, 1934 |
| 2,107,773 | Axe | Feb. 8, 1938 |
| 2,120,783 | Hoffman | June 14, 1938 |
| 2,192,519 | King | Mar. 5, 1940 |
| 2,255,725 | Trescher | Sept. 9, 1941 |
| 2,311,182 | Bohn | Feb. 16, 1943 |